(12) United States Patent
Kim et al.

(10) Patent No.: US 7,119,157 B2
(45) Date of Patent: Oct. 10, 2006

(54) METHODS OF PREPARING EP(D)M ELASTOMER, OF CONTROLLING YIELD THEREOF, AND OF RECOVERING THE SAME

(75) Inventors: Sang Bae Kim, Yeosu (KR); Hee Ryoung Koo, Yeosu (KR)

(73) Assignee: Kumho Polychem Co., Ltd., Seoul (KR)

( * ) Notice: Subject to any disclaimer, the term of this patent is extended or adjusted under 35 U.S.C. 154(b) by 0 days.

(21) Appl. No.: 11/138,072

(22) Filed: May 26, 2005

(65) Prior Publication Data

US 2006/0106179 A1    May 18, 2006

(30) Foreign Application Priority Data

Nov. 18, 2004   (KR) ...................... 10-2004-0094750

(51) Int. Cl.
    *C08F 2/06*      (2006.01)
    *C08F 210/18*    (2006.01)
(52) U.S. Cl. ........................ 526/336; 526/72; 526/282; 526/339; 528/500
(58) Field of Classification Search ................ 528/500; 526/282, 336, 72, 339
    See application file for complete search history.

(56) References Cited

U.S. PATENT DOCUMENTS

| | | | | |
|---|---|---|---|---|
| 3,652,515 A | * | 3/1972 | Love | .......................... 526/281 |
| 3,718,632 A | * | 2/1973 | Gardner et al. | ................ 526/65 |
| 6,686,419 B1 | * | 2/2004 | Wouters et al. | ............. 525/237 |

\* cited by examiner

*Primary Examiner*—Fred Teskin
(74) *Attorney, Agent, or Firm*—Knobbe, Martens, Olson & Bear, LLP (57) ABSTRACT

Disclosed herein is a method of preparing an EP(D)M elastomer, which includes pre-cooling a reactive solvent to −80 to −100° C.; and polymerizing ethylene, at least one higher α-olefin having 3 to 18 carbons, and selectively, at least one conjugated or non-conjugated diene having 5 to 15 carbons, in the presence of the reactive solvent. According to the method of the current invention, the yield of the EP(D)M elastomer is drastically increased even though a conventional preparation device is used unchanged. Further, methods of controlling the yield of the EP(D)M elastomer and of recovering the EP(D)M elastomer are provided.

11 Claims, 2 Drawing Sheets

METHODS OF PREPARING EP(D)M ELASTOMER, OF CONTROLLING YIELD THEREOF, AND OF RECOVERING THE SAME

CROSS-REFERENCE TO RELATED APPLICATIONS

This application claims the benefit of Korean Patent Application No. 2004-94750, filed Nov. 18, 2004.

FIELD OF THE INVENTION

The present invention relates, generally, to methods of preparing an EP(D)M (Ethylene Propylene (Diene) Monomer) elastomer and of controlling yield thereof. More particularly, the present invention relates to a method of drastically increasing the yield of an EP(D)M elastomer and a method of controlling the yield thereof, even if using an unchanged conventional preparation device.

DESCRIPTION OF THE RELATED ART

In a conventional process of preparing an EP(D)M elastomer, a loading temperature of a supply stream into a reactor is maintained in the range from −50 to 0° C., so as to produce a desired polymer at a solid concentration of about 5 to 7 wt % per unit time. At this time, the reactor is maintained at 30 to 70° C. Typically, the polymerization is conducted in the presence of a Ziegler Natta catalyst at about 50° C., in which the above temperature required for the polymerization is controlled by loading monomers and a solvent, pre-cooled to −50° C. or less, into the reactor. As such, heat created upon polymerization may be removed using a solvent or using heat of vaporization. The removal of the heat of polymerization using the solvent results in 5–7% production of polymer. In addition, when the heat of polymerization is removed using heat created by vaporization of propylene, a 15% polymer is obtained. However, the conventional process of preparing EP(D)M does not provide any other than a method of increasing the temperature of the monomer or using an expensive catalyst, for increasing the yield of the polymer using an unchanged conventional preparation device. If the operating conditions of the reactor are not changed, that is, if only the temperature of the monomer is increased while the solvent is supplied at a constant temperature, large quantities of heat of polymerization are generated, and hence, it is difficult to maintain the reaction temperature required for the catalyst. Further, the constant temperature of the solvent places many restrictions on desired alterations of the production yield. Thus, since the reaction temperature is limited due to the heat of polymerization, the production yield cannot be readily controlled.

Also, instead of a conventionally used inexpensive catalyst, the use of the catalyst having a high reaction temperature results in increased yield of the polymer, despite high preparation costs.

In addition, when the EP(D)M polymer thus obtained is recovered, a steam stripping process is typically used, in which the temperature in the reactor is maintained at 95° C. or higher using steam, whereby the solvent is continuously volatilized to be separated from the polymer. As such, however, the above process requires a drying and recovery system for removal of an aqueous component from polymer slurry containing the aqueous component. Moreover, the above process is disadvantageous because additional processes for preventing formation of polymer droplets and gel in the upper air ventilation system, and removing miscible liquid or gas are needed upon separation of the immiscible fluid from the polymer slurry, thus increasing preparation costs.

SUMMARY OF THE INVENTION

Accordingly, the present invention has been made keeping in mind the above problems occurring in the related art, and an object of the present invention is to provide a method of preparing an EP(D)M elastomer having a drastically increased yield using an unchanged conventional EP(D)M preparation device, merely by controlling the reaction temperature.

Another object of the present invention is to provide a method of maintaining the yield of an EP(D)M elastomer at a desired level using an unchanged conventional EP(D)M preparation device, by controlling the reaction temperature.

A further object of the present invention is to provide a method of recovering an EP(D)M elastomer, which solves the problems of a conventional steam stripping process.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENT

In the present invention, a method of preparing an EP(D)M elastomer is provided, which includes pre-cooling a solvent to −80 to −100° C., and polymerizing ethylene, at least one higher α-olefin having 3 to 18 carbons, and, selectively, at least one conjugated or non-conjugated diene having 5 to 15 carbons, in the presence of the solvent.

Further, a method of controlling the yield of an EP(D)M elastomer is provided, which includes pre-cooling a solvent to a desired temperature in the temperature range up to a freezing point of the solvent, and polymerizing ethylene, at least one higher α-olefin having 3 to 18 carbons, and selectively, at least one conjugated or non-conjugated diene having 5 to 15 carbons, in the presence of the solvent.

The higher α-olefin used in the present invention is branched, straight linear, cyclic and substituted or unsubstituted aromatic compounds, and preferably, includes higher olefin having 3 to 18 carbons. The higher olefin includes, for example, propylene, butene-1, pentene-1,3-methylbutene-1, hexene-1,3-methylpentene-1,4-methylpentene-1, heptene-1, 3-methylhexene-1,4-methylhexene-1,5-methylhexene-1,3-ethylhexene-1, octene-1,3-methylheptene-1,4-methylheptene-1,5-methylheptene-1,6-methylheptene-1,3-ethylhexene-1,4-ethylhexene-1,3-propylhexene-1, decene-1, etc. Of these olefins, propylene is most preferable.

The conjugated or non-conjugated diene is selectively used. Usable in the present invention, conjugated or non-conjugated diene includes straight linear or branched diolefin hydrocarbons or cycloalkenyl substituted alkenes, each of which has 5 to 15 carbons. The diene compound includes, for example, straight linear non-alicyclic diene, such as 1,4-hexadiene, 1,6-octadiene, etc., branched non-alicyclic diene, such as 5-methyl-1,4-hexadiene, 3,7-dimethyl-1,6-octadiene, 3,7-dimethyl-1,7-octadiene or a mixture isomer of dihydro-myrcene and dihydro-ocimene, alicyclic diene having a single ring, such as 1,4-cyclohexadiene, 1,5-cyclooctadiene and 1,5-cyclodecadiene, alicyclic diene having fused or bridged multiple rings, such as tetrahydroindene, methyltetrahydroindene, dicyclopentadiene, or bicyclo(2,2,1)-hepta-2,5-diene, or alkenyl-, alkylidene-, cycloalkenyl-, and cycloalkylidene-norbornene, for example, 5-methylene-2-norbornene (MNB), 5-ethylidene-2-norbornene (ENB), 5-propenyl-2-norbornene, 5-isopropylidene-2-norbornene, 5-(4-cyclopentenyl)-2-norbornene, 5-cyclohexylidene-2-norbornene, etc. Of these diene compounds, 5-ethylidene-2-norbornene (ENB) is most preferable.

The solvent used for the reaction includes any solvent suitable for solution polymerization, and preferably, aliphatic, alicyclic or aromatic hydrocarbons, for example, straight linear or branched saturated hydrocarbons having 12 or less carbons, or alicyclic or aromatic saturated hydrocarbons having 5 to 9 carbons. The solvent or reactive medium includes, for example, butane, pentane, hexane, heptane, cyclopentane, cyclohexane, cycloheptane, methylcycloheptane, methylcyclopentane, methylcyclohexane, isooctane, benzene, toluene and xylene. Of these solvents, hexane is most preferable.

The constitutive monomers of the EPM copolymer prepared according to the present invention are composed of 30–85 wt %, preferably, 40–80 wt % ethylene, and at least 20 wt %, preferably, 30 wt % or more α-olefin. Further, the EPDM terpolymer is composed additionally of 0.5–20 wt %, preferably 1–15 wt % conjugated or non-conjugated diene, in addition to the above two constitutive monomers.

The elastomer of the present invention has a molecular weight distribution ($M_w/M_n$) of 1.0–15, and preferably 1.5–10. The measurement of the molecular weight distribution is conducted using gel permeation chromatography (GPC) under the same conditions as the elastomer preparation method disclosed in Korean Patent Laid-open Publication No. 2000-23740. A weight average molecular weight ($M_w$) using GPC is 20,000 or more, and preferably, 50,000 or more.

In the present invention, the polymerization is preferably performed in the presence of a catalyst, in which the usable main catalyst is exemplified by a metal compound containing a transition metal belonging to Groups IVb, Vb or VIb in the periodic table. Preferably, the transition metal is vanadium or titanium. Most preferable is a vanadium-containing metal compound represented by a general formula of $VO_zX_t$ (wherein z is 0–1, t is 2–4, and X is independently selected from among halogen compounds having atomic numbers larger than 17, such as acetylacetonate, haloacetylacetonate, alkoxide, and haloalkoxide). Specifically, the catalyst includes, for example, $VOCl_3$, $VCl_4$, $VO(Oet)_3$, $VO(AcAc)_2$, $VOCl_2(Obu)$, $V(AcAc)_3$ or $VOCl_2AcAc$ (wherein AcAc represents acetylacetonate). Preferably, the catalyst includes, for example, $VOCl_3$, $VOCl_4$ or mixtures thereof containing $TiCl_3$. The titanium catalyst is used along with the vanadium catalyst, and includes a metal compound represented by a general formula of $Ti(OR)_4$, in which R is non-alicyclic hydrocarbons or monovalent alicyclic hydrocarbon radicals, each of which has 1 to 12 carbons.

In addition to the main catalyst, a cocatalyst may be further included. The cocatalyst includes an organic compound containing a metal belonging to Groups IIa, IIb or IIIa in the periodic table, and preferably, a compound represented by a general formula of $AlR'_mX'_n$, in which R' is a monovalent hydrocarbon radical including alkyl, alkyl-aryl and cycloalkyl having 1 to 12 carbons, m is 1–3, X' is halogen (Cl, Br and I) having the atomic number equal to or larger than 17, and m and n total 3. Also, various cocatalyst mixtures may be used. The cocatalyst includes, for example, $Al(Et)_3$, $Al(isoBu)_3$, $Et_2AlCl$, $EtAlCl_2$ and $Et_3Al_2Cl_3$, and preferably, diethylaluminum chloride, or ethylaluminum sesquichloride.

Furthermore, a method of recovering an EP(D)M elastomer is provided, which includes pre-heating a mixture of EP(D)M elastomer and solvent by heat exchange using steam immiscible therewith, reducing the pressure of the mixture to primarily remove the solvent, and thermally drying the mixture obtained in the previous step to secondarily remove the residual solvent from the mixture.

Hereinafter, the processes of operating the reactor, decatalyzing and recovering the non-reactive monomer, and separating the polymer are described.

Operation of Reactor

The polymerization of the present invention is representatively exemplified by solution polymerization. Solution polymerization, which is an exothermic reaction, acts to disperse large quantities of reaction heat of a continuously stirred reaction mixture. As such, the heat of polymerization may be maintained at a predetermined temperature by continuously loading the supply stream pre-cooled to −80 to −100° C. into the reactor.

Specifically, the supply stream includes ethylene, at least one higher α-olefin having 3 to 18 carbons, at least one conjugated or non-conjugated diene having 5 to 15 carbons as a selective component, and a solvent. The supply stream, which is used in a predetermined amount, is pre-cooled to −80 to −100° C. before it is continuously loaded into the reactor. In this case, the cooling temperature may reach the freezing point of the solvent, and is controlled depending on the temperature of the reactor.

The amount of the supply stream varies with the amount and composition of the polymer as a reaction product. According to the present invention, the supply stream may be added in an amount increased by 150–250% into the reactor. In addition, the amount of the product may be further increased 1.5–2.5 times, compared to conventional preparation methods. As such, the amount of solvent in the supply stream need not be increased.

The concentration and amount of the main catalyst used in the reaction vary in proportion to the amount of the supply stream (monomers), depending on the molecular weight, molecular weight distribution and composition of the polymer. At this time, the cocatalyst may be used together with the main catalyst, if required. The amount of the catalyst is dependent on the amount of the supply stream loaded into the reactor and the composition and molecular weight of the polymer.

Further, a single reactor, two or more parallel reactors, or two or more series of reactors may be used. In addition, a reactor system disclosed in U.S. Pat. Nos. 3,629,212, 4,016,342 and 4,306,041 may be used.

The temperature of the reactor is maintained at 70° C. or less, and preferably 50° C. or less, to prevent reduction of thermal stability, in the presence of a vanadium catalyst well known as a Ziegler Natta catalyst. Also, the loading temperature of the supply stream is maintained in the range from −80 to −100° C. so that the amount of the solid polymer produced per unit time reaches 11–15 wt %.

The main catalyst and the cocatalyst are fed into the reactor through separate inlets of the reactor, and the polymerization vessel serves as a continuous stirring tank. To minimize the transfer of external heat to the reactor, the reactor is preferably treated to be insulated from heat. The reactor is maintained at a pressure of 5–20 Kgf/cm²G, and preferably 8–12 Kgf/cm²G, and at about 30–60° C. The retention time in the reactor ranges from 5 to 15 min.

The composition of the polymer prepared according to the present invention varies with the amount of monomers in the supply stream loaded into the reactor. Moreover, the amount of the polymer prepared in the reactor may depend on the reaction temperature, the amount of supply stream (monomer), and the catalyst concentration, which are operating conditions of the reactor. The molecular weight of the polymer is controlled by the reaction temperature, the concentration of the monomer, and the addition of a chain transferring agent such as hydrogen.

Decatalyzing and Recovery of Non-reactive Monomer

The decatalyzing process functions to remove the catalyst remaining after the polymerization. A hydroxide material, such as water or alcohol, generally used to terminate the polymerization, is used in an amount of 50 to 150 vol %, and preferably 60 to 80 vol %, based on the amount of reagent stream discharged from the reactor. To increase the miscibility between the discharged stream and the hydroxide material, a soap-like emulsifier is added in an amount of 0.001–0.01 wt %. After the polymerization is terminated, the reactor is allowed to stand for 10–120 min, and preferably 20–60 min. Subsequently, the hydroxide layer is removed by the difference in specific gravity, whereby the residual catalyst dissolved in the hydroxide layer is removed. The non-reactive monomer is recovered through pressure reduction, and then, the following processes of recovering the solvent and separating the polymer are carried out.

Separation (Recovery) of Polymer (Direct Drying)

Figure 1:
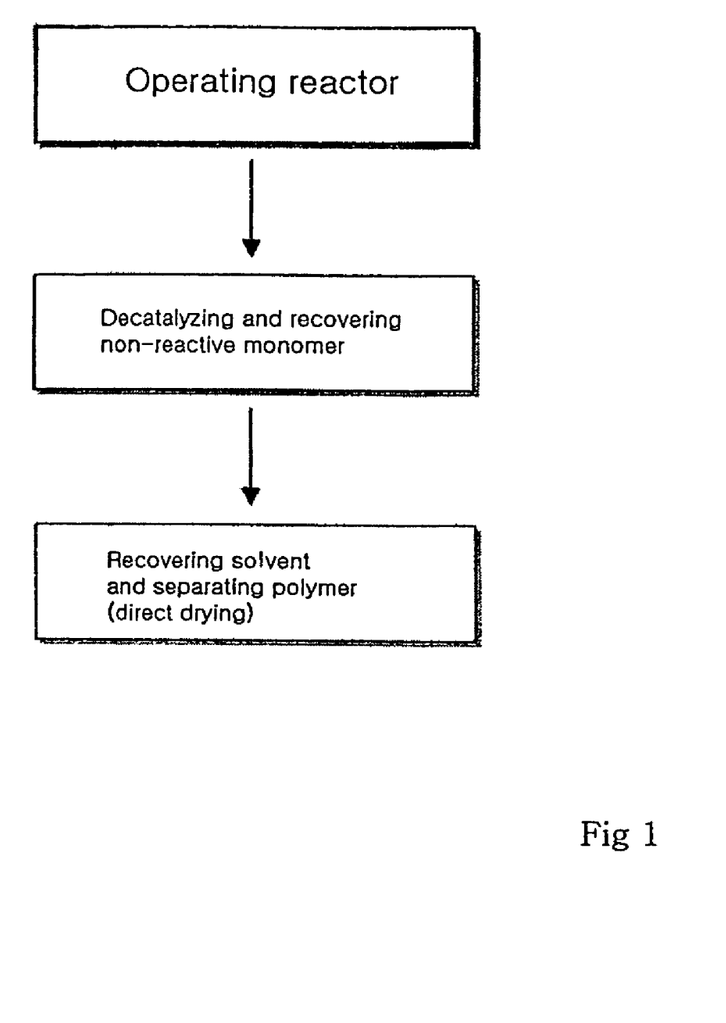
FIG. 1 is a flow chart schematically showing a process of preparing an EP(D)M elastomer, according to the present invention.
Figure 2:
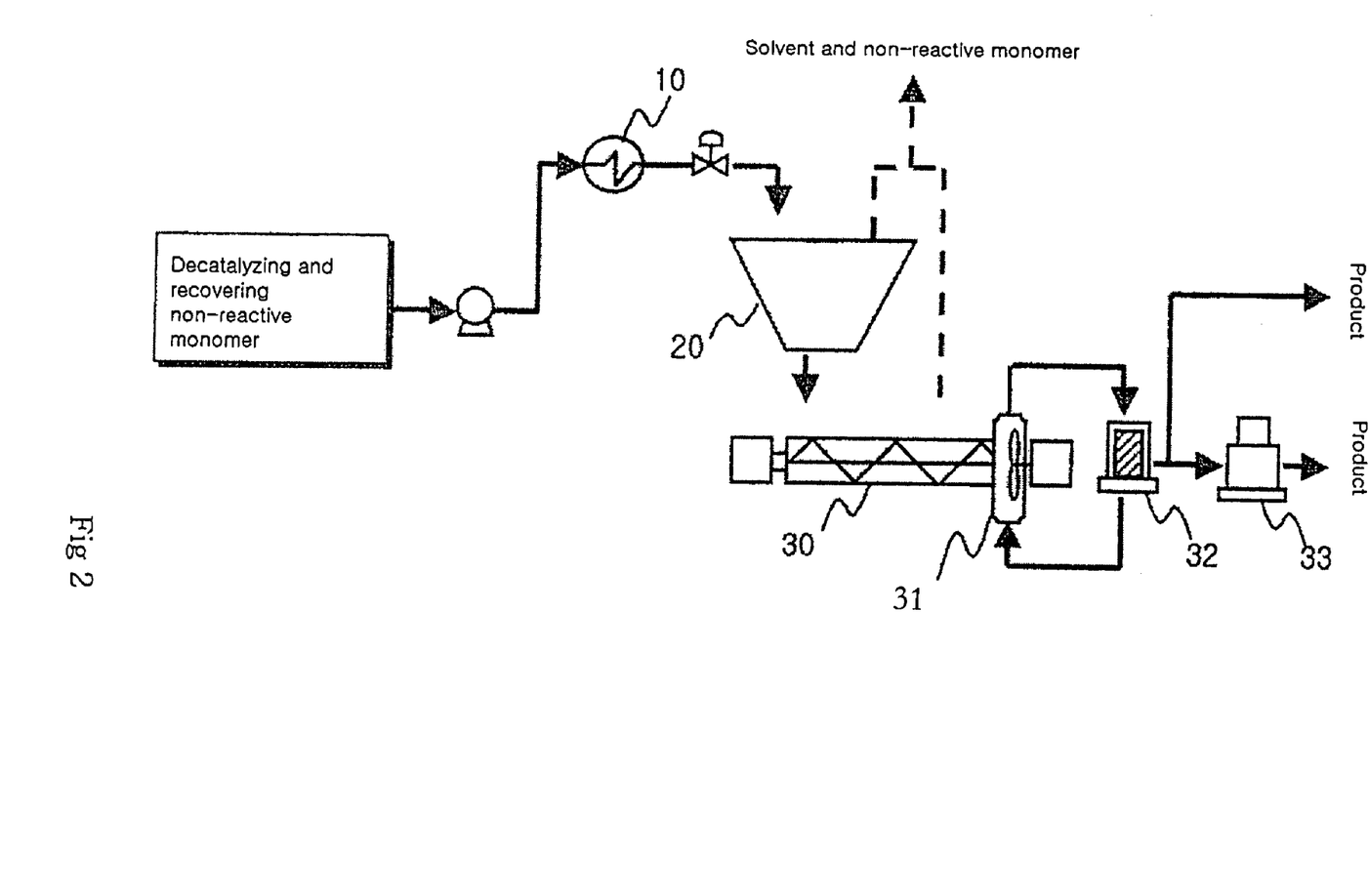
FIG. 2 is a view schematically showing a process of recovering the elastomer using direct drying, according to the present invention.

The polymer stream obtained in the previous step includes the solid polymer, the non-reactive monomer residue, and the reactive solvent. The recovery process of the present invention is advantageous because it has lower energy consumption and is simpler, compared to a conventional steam stripping process. In the present invention, the polymer is recovered by thermal treatment, pressure reduction using a flash vessel 20, and then thermal drying (extrusion) (FIG. 2).

The temperature of the reaction product (containing EPM or EPDM), obtained by removing the catalyst and the non-reactive monomer in the previous step, is increased from about 30–60° C. to 220–300° C. using a heat exchanger 10, for solvent recovery. To prevent separation of the product from the solvent due to the temperature increase, the pressure is maintained at 350–500 psi using a control valve and then is drastically reduced to atmospheric pressure or less, and preferably, 500 torr (mmHg) or less, thereby separating the non-reactive monomer remaining from the previous step and almost all of the solvent from the reaction product.

On the other hand, before the product is loaded into the flash vessel 20, at least one static mixer may be installed to achieve uniform heat transfer, and also, a circulation line connected to the heat exchanger 10 may be installed to sufficiently increase the temperature and pressure.

The reaction product includes about 60% or more solid, which is a semi-solid state resulting from partially flashing off the monomer and the solvent. The product is transferred to a twin-screw thermal dryer 30 by specific gravity, to obtain a 2000 ppm or less elastomer (EPM or EPDM).

Further, a pelletizer 31 and a baler 33 used for commercial fabrication of plastics or rubbers are included to easily use, store, and transport the polymer. In a preferred embodiment, the polymer product after being volatilized is cut in water and transferred along with water, and then, water is dried using a centrifuger 32 and the resultant product is supplied into the baler 33. Preferably, by recovering the polymer from the reaction product stream, the non-reactive monomer and the solvent are separated and purified to be reused.

A better understanding of the present invention may be obtained in light of the following examples which are set forth to illustrate, but are not to be construed to limit the present invention.

EXAMPLES 1–3

A 9.7 L single reactor able to be continuously stirred was used to produce a polymer. Solution polymerization was conducted, and a supply stream was composed of ethylene, propylene, 5-ethylidene-2-norbornene (ENB), and an n-hexane solvent. Before the supply stream was continuously loaded into the reactor through a heat exchanger, it was mixed with a predetermined amount of hydrogen as a molecular weight controlling agent and an appropriate molecular structure controlling agent.

The composition of each supply stream is included in the operating conditions given in Tables, below. Predetermined amounts of a vanadium catalyst and an alkyl aluminum catalyst were continuously introduced into the reactor through separate feeding lines, and the reactor was maintained at a pressure of 10 kgf/cm² at about 40–50° C. for a reaction time of about 7–10 min.

Of the supply stream, ethylene, propylene, ENB and the catalyst were used in amounts of 200% or more, with the exception of n-hexane as the solvent. The supply stream, with the exception of the catalyst, was cooled to −100° C., and preferably, −95° C., which was a freezing point of n-hexane, and then loaded into the reactor, to maintain the temperature of the reactor at 60° C. or less, and preferably, 50° C. or less. Without increasing the volume of the reactor or changing the retention time, the amount of the polymer per unit time was increased by 190–210%.

After the polymerization, a de-ashing process known to terminate the reaction and remove the catalyst was performed, in which the stream discharged from the reactor was mixed with about 65 vol % water, a 0.01 wt % emulsifier, and a 2000 ppm antioxidant Irganox 1076 while being stirred using a mixer rotating at 1500 rpm or more, and loaded into a drum to be allowed to stand for about 30 min or longer. Thereafter, an aqueous layer was separated from the reaction product to remove the residual catalyst from the aqueous layer. In addition, the pressure was reduced to recover the non-reactive monomer from the reaction product, after which the reaction product was transferred to the following processes to recover the solvent and separate the polymer.

In Examples 1 and 2, a conventional steam stripping process was used, in which the reaction stream after decatalyzing and recovering the non-reactive monomer was continuously transferred into a stripper maintained at about 95° C. using steam, to volatilize the solvent to be separated from the polymer. Subsequently, the polymer slurry (EPM or EPDM) was fed into a dryer. The separated solvent was cooled using a suitable heat exchanger to be reused.

The extrusion dryer used in rubber fields was operated at a predetermined temperature to control the amount of the volatile matter in the final polymer at 0.5 wt % or less.

In Example 3, a direct drying process was used, instead of the conventional stripping process. That is, the stream at 30 to 60° C. after the removal of the catalyst and recovery of the non-reactive monomer was heated to about 180° C. using a suitable heat exchanger (multi-tube type) through steam under a high pressure (375 psi), and then fed into a static mixer for uniform mixing while maintaining the pressure at 450 psi using a pressure control valve to prevent separation of the solvent from the polymer.

A hot oil was fed into an outer jacket of the static mixer to prevent drastic temperature drop. In addition, while the discharging pressure was maintained at 120 to 150 psi through the control valve, the stream was fed into the pressure reduction device (flash vessel). By drastically reducing the pressure to a vacuum of 500 torr (mmHg) or less, the non-reactive monomer which had not been recovered in the previous step, and almost all of the solvent were separated from the stream, purified and reused. The reaction product was composed of about 80 wt % or more solid. Of the stream after partially flashing off the monomer and the solvent, the semi-solid (molten) polymer and the solvent were dropped into the twin screw thermal dryer to recover the residual solvent.

In the polymer, the volatile matter containing solvent was maintained at 2000 ppm or less, and the volatilized polymer was cut in water using a Gala pelletizer and then transferred along with water, following drying water using a centrifuger.

The reactor operating conditions, fundamental polymer analytic values, and mixing operations for EPDM according to ASTM methods are summarized in Tables, below. Further, in Tables, below, there are shown the results of comparing products of conventional polymerizations with those of the inventive polymerization using direct drying, according to mixing methods used in an automotive heater hose of Example 1, a bicycle tire tread rubber of Example 2 and a wire/cable of Example 3.

TABLE 1-1

Reactor Operating Conditions In Example 1

| Operating Conditions | Conventional | Inventive |
|---|---|---|
| Inflow Temperature into Reactor (° C.) | −34 | −90 |
| Outflow Temperature from Reactor (° C.) | 38 | 47 |
| ΔT (° C.) | 72 | 137 |
| Polymer Yield (kg/hr) | 2.42 | 4.98 |
| Feeding Amount | | |
| ET (kg/hr) | 1.84 | 3.67 |
| ET conversion (%) | 91 | 91 |
| PP (kg/hr) | 2 | 4.3 |
| PP conversion (%) | 35 | 33 |
| ENB (kg/hr) | 0.29 | 0.55 |
| ENB conversion (%) | 68 | 70 |
| V-CAT (g/hr) | 2.7 | 5.4 |
| A-CAT (g/hr) | 9.9 | 19.8 |
| Hexane (kg/hr) | 37 | 37 |

TABLE 1-2

Polymer Properties And ASTM Composition In Example 1

| | Conventional | Inventive | Note |
|---|---|---|---|
| (Polymer Properties) | | | |
| Mooney Viscosity | | | ASTM D1646, modified |
| ML1 + 4, 125° C. (MU) | 57 | 57 | |
| Mooney Relaxation Area | | | ASTM D1646, modified |
| (MU-sec) | 280 | 300 | |
| Ethylene (%) | 68.5 | 68.4 | ASTM D3900 |
| ENB (%) | 4.6 | 5 | ASTM D6047 |
| Mw/Mn | 5.5 | 5.2 | |
| (ASTM Composition) | | | ASTM D2084 |
| Mooney Viscosity of Composition | | | |
| ML1 + 4, 100° C. | 68 | 68 | |
| Mooney Scorch (ML1-125° C.) | | | |
| Vm | 48 | 47 | |
| t5(m, s) | 12.29 | 12.14 | |
| t35(m, s) | 20.05 | 19.21 | |
| ODR(160° C. × 30 min, ±1 arc, 100 cpm) | | | |
| ML (lb-in) | 6.19 | 6.00 | |
| MH (lb-in) | 55.08 | 54.11 | |
| ts2 (m, s) | 2.06 | 2.22 | |
| T90 (m, s) | 12.33 | 12.18 | |
| Properties (160° C. × 30 min, vulcanizing press) | | | |
| 100% Modulus (kg/cm$^2$) | 40 | 41 | |
| 200% Modulus (kg/cm$^2$) | 99 | 100 | |
| 300% Modulus (kg/cm$^2$) | 167 | 166 | |
| Tension (kg/cm$^2$) | 213 | 210 | |
| Elongation (%) | 370 | 370 | |
| Hardness (JIS-A) | 70 | 69 | |

Note:
ASTM composition: EPDM 100 phr, zinc oxide 5 phr, stearic acid 1 phr, IRB#7 80 phr, naphthene oil 50 phr, accelerator MBT 0.5 phr, accelerator TMTDS 1.0 phr, sulfur 1.5 phr

TABLE 1-3

Application To Automotive Heater Hose

| | Conventional | Inventive |
|---|---|---|
| Mooney Viscosity of Composition | | |
| ML1 + 4, 100° C. | 57 | 56.5 |
| Mooney Scorch (ML1-125° C.) | | |
| Vm | 42 | 40.5 |
| t5(m, s) | 9.36 | 9.24 |
| t35(m, s) | 17.30 | 17.06 |
| ODR(180° C. × 30 min, ±1 arc, 100 cpm) | | |
| ML (lb-in) | 3.86 | 3.88 |
| MH (lb-in) | 34.96 | 35.44 |
| ts2 (m, s) | 1.23 | 1.23 |
| T90 (m, s) | 2.42 | 2.30 |
| Properties (180° C. × 10 min, vulcanizing press) | | |
| 100% Modulus (kg/cm$^2$) | 38 | 39 |
| 200% Modulus (kg/cm$^2$) | 79 | 81 |
| Tension (kg/cm$^2$) | 134 | 134 |
| Elongation (%) | 390 | 390 |
| Hardness (JIS-A) | 68 | 67 |
| Tear Strength (JIS-B) | 55 | 53 |

TABLE 1-3-continued

Application To Automotive Heater Hose

| | Conventional | Inventive |
|---|---|---|
| Heat Resistance (160° C. × 168 hr, hot air oven) | | |
| ΔT (%)(tension change) | −32 | −30 |
| ΔEb (%)(elongation change) | −64 | −66 |
| ΔHs (points)(hardness change) | +11 | +11 |

Note:
composition for automotive heater hose: EPDM 100 phr, zinc oxide 5 phr, stearic acid 1 phr, FEF black 130 phr, paraffin oil 80 phr, antioxidant TMDQ 1 phr, antioxidant MBI 0.5 phr, accelerator CBS 1 phr, accelerator TMTDS 0.7 phr, accelerator DPTT 0.5 phr, accelerator MBT 1 phr, accelerator ZnBDC 1 phr, accelerator #22 0.5 phr, DTDM 1 phr, sulfur 0.3 phr

TABLE 2-1

Reactor Operating Conditions In Example 2

| Operating Conditions | Conventional | Inventive |
|---|---|---|
| Inflow Temperature into Reactor (° C.) | −34 | −90 |
| Outflow Temperature from Reactor (° C.) | 35 | 44 |
| ΔT (° C.) | 70 | 134 |
| Polymer Yield (kg/hr) | 2.45 | 5.05 |
| Feeding Amount | | |
| ET (kg/hr) | 1.45 | 2.92 |
| ET conversion (%) | 90 | 90 |
| PP (kg/hr) | 2.8 | 6.2 |
| PP conversion (%) | 35 | 32 |
| ENB (kg/hr) | 0.45 | 0.8 |
| ENB conversion (%) | 76 | 85 |
| V-CAT (g/hr) | 5 | 10 |
| A-CAT (g/hr) | 17 | 34 |
| Hexane (kg/hr) | 33 | 33 |

TABLE 2-2

Polymer Properties And ASTM Composition In Example 2

| | Conventional | Inventive | Note |
|---|---|---|---|
| (Polymer Properties) | | | |
| Mooney Viscosity | | | ASTM D1646, modified |
| ML1 + 4, 125° C. (MU) | 58 | 56 | |
| Mooney Relaxation Area | | | ASTM D1646, modified |
| (MU-sec) | 640 | 580 | |
| Ethylene (%) | 57 | 58 | ASTM D3900 |
| ENB (%) | 8.3 | 8.2 | ASTM D6047 |
| Mw/Mn | 8.8 | 9.9 | |
| (ASTM Composition) | | | ASTM D2084 |
| Mooney Viscosity of Composition | | | |
| ML1 + 4, 100° C. | 53 | 52 | |
| Mooney Scorch (ML1-125° C.) | | | |
| Vm | 37.5 | 36 | |
| t5(m, s) | 11.16 | 11.51 | |
| t35(m, s) | 17.28 | 17.59 | |
| ODR(160° C. × 30 min, ±1 arc, 100 cpm) | | | |
| ML (lb-in) | 5.52 | 5.04 | |
| MH (lb-in) | 56.61 | 54.08 | |
| ts2 (m, s) | 2.31 | 2.33 | |
| T90 (m, s) | 10.51 | 10.03 | |
| Properties (160° C. × 30 min, vulcanizing press) | | | |
| 100% Modulus (kg/cm$^2$) | 48 | 48 | |
| 200% Modulus (kg/cm$^2$) | 110 | 112 | |
| Tension (kg/cm$^2$) | 153 | 158 | |
| Elongation (%) | 277 | 273 | |
| Hardness (JIS-A) | 71 | 71 | |

Note:
ASTM composition: EPDM 100 phr, zinc oxide 5 phr, stearic acid 1 phr, IRB#7 80 phr, naphthene oil 50 phr, accelerator MBT 0.5 phr, accelerator TMTDS 1.0 phr, sulfur 1.5 phr

TABLE 2-3

Application To Bicycle Tire Tread

| | Conventional | Inventive |
|---|---|---|
| Mooney Viscosity of Composition | | |
| ML1 + 4, 100° C. | 55 | 55 |
| Mooney Scorch (ML1-125° C.) | | |
| Vm | 43 | 44 |
| t5(m, s) | 9.06 | 8.06 |
| t35(m, s) | 10.24 | 9.24 |
| ODR(160° C. × 30 min, ±1 arc, 100 cpm) | | |
| ML (lb-in) | 6.05 | 6.63 |
| MH (lb-in) | 43.01 | 43.85 |
| ts2 (m, s) | 1.73 | 1.54 |
| T90 (m, s) | 4.06 | 3.62 |
| ODR(180° C. × 30 min, ±1 arc, 100 cpm) | | |
| ML (lb-in) | 5.92 | 6.35 |
| MH (lb-in) | 40.29 | 40.04 |
| ts2 (m, s) | 1.03 | 0.94 |
| T90 (m, s) | 1.96 | 1.76 |
| Properties (180° C. × 10 min, vulcanizing press) | | |
| 100% Modulus (kg/cm$^2$) | 32 | 32 |
| 200% Modulus (kg/cm$^2$) | 78 | 75 |
| Tension (kg/cm$^2$) | 170 | 168 |
| Elongation (%) | 400 | 410 |
| Hardness (JIS-A) | 67 | 67 |
| Tear Strength (JIS-B) | 47 | 46 |
| Heat Resistance (100° C. × 72 hr, hot air oven) | | |
| ΔT (%)(tension change) | −32 | −33 |
| ΔEb (%)(elongation change) | −30 | −28 |
| ΔHs (points)(hardness change) | +6 | +4 |
| Ozone Resistance (40° C. × 72 hr, 50 ppm, 30% increase) | | |
| Static Test | No Crack | No Crack |

Note:
composition for bicycle tire tread: NR (SMR 20) 70 phr, EPDM 30 phr, zinc oxide 5 phr, stearic acid 2 phr, FAF black 50 phr, naphthene oil 10 phr, antioxidant DPG 0.3 phr, accelerator CZ 0.5 phr, accelerator M 0.8 phr, sulfur 1.6 phr

TABLE 3-1

Reactor Operating Conditions In Example 3

| Operating Conditions | Conventional | Inventive |
|---|---|---|
| Inflow Temperature into Reactor (° C.) | −34 | −90 |
| Outflow Temperature from Reactor (° C.) | 41 | 47 |
| ΔT (° C.) | 75 | 137 |
| Polymer Yield (kg/hr) | 2.48 | 4.92 |
| Feeding Amount | | |
| ET (kg/hr) | 1.8 | 3.6 |
| ET conversion (%) | 90 | 90 |
| PP (kg/hr) | 1.6 | 3.7 |
| PP conversion (%) | 42 | 37 |
| ENB (kg/hr) | 0.31 | 0.6 |
| ENB conversion (%) | 70 | 72 |
| V-CAT (g/hr) | 2.8 | 5.6 |
| A-CAT (g/hr) | 9.9 | 20 |
| Hexane (kg/hr) | 37 | 37 |

TABLE 3-2

Polymer Properties And ASTM Composition In Example 3

| Reactor Operating (Polymer Recovery) | Reference (slurry) | Conventional | Inventive | Note |
|---|---|---|---|---|
| (Polymer Properties) | | | | |
| Volatile Matter (%) | 0.56 | 0.15 | 0.11 | ISO 248, modified |
| Mooney Viscosity | | | | ASTM D1646, modified |
| ML1 + 4, 125° C. (MU) | 23.5 | 20 | 21 | |
| Mooney Relaxation Area | | | | ASTM D1646, modified |
| (MU-sec) | 190 | 110 | 120 | |
| Ethylene (%) | 70.6 | 70.5 | 70.6 | ASTM D3900 |
| ENB (%) | 5.7 | 5.7 | 5.6 | ASTM D6047 |
| Mw/Mn | 5 | 4.9 | 5.3 | |
| (ASTM Composition) | | | | ASTM D2084 |
| Mooney Viscosity of Composition | | | | |
| ML1 + 4, 100° C. | 27.5 | 25.5 | 26 | |
| ODR(160° C. × 30 min, ±1 arc, 100 cpm) | | | | |
| ML (lb-in) | 2.68 | 2.55 | 2.48 | |
| MH (lb-in) | 34.15 | 32.09 | 32.45 | |
| ts2 (m, s) | 2.35 | 2.47 | 2.55 | |
| T90 (m, s) | 11.41 | 11.25 | 11.19 | |
| Properties (160° C. × 30 min, vulcanizing press) | | | | |
| 200% Modulus (kg/cm²) | 85 | 82 | 81 | |
| 300% Modulus (kg/cm²) | 123 | 120 | 121 | |
| Tension (kg/cm²) | 130 | 127 | 128 | |
| Elongation (%) | 330 | 340 | 340 | |
| Hardness (JIS-A) | 76 | 75 | 76 | |

Note:
ASTM composition: EPDM 100 phr, zinc oxide 5 phr, stearic acid 1 phr, IRB#7 80 phr, naphthene oil 50 phr, accelerator MBT 0.5 phr, accelerator TMTDS 1.0 phr, sulfur 1.5 phr

TABLE 3-3

Application To Wire/Cable

| Reactor Operating (Polymer Recovery) | Reference (slurry) | Conventional | Inventive |
|---|---|---|---|
| Mooney Viscosity of Composition | | | |
| ML1 + 4, 100° C. | 29 | 27 | 27 |
| Mooney Scorch (ML1-125° C.) | | | |
| Vm | 17 | 16 | 15.5 |
| t5(m, s) | 15.01 | 15.55 | 15.43 |

TABLE 3-3-continued

Application To Wire/Cable

| Reactor Operating<br>(Polymer Recovery) | Reference<br>(slurry) | Conventional | Inventive |
|---|---|---|---|
| t35(m, s) | 52.45 | 53.19 | 53.03 |
| ODR(160° C. × 30 min, ±1 arc, 100 cpm) | | | |
| ML (lb-in) | 2.52 | 2.41 | 2.45 |
| MH (lb-in) | 36.26 | 35.16 | 35.65 |
| ts2 (m, s) | 1.25 | 1.34 | 1.32 |
| T90 (m, s) | 17.25 | 17.35 | 18.12 |
| Properties (160° C. × 30 min, vulcanizing press) | | | |
| 300% Modulus (kg/cm$^2$) | 53 | 50 | 50 |
| Tension (kg/cm$^2$) | 100 | 97 | 98 |
| Elongation (%) | 520 | 540 | 530 |
| Hardness (JIS-A) | 74 | 73 | 73 |
| Tear Strength (JIS-B) | 46 | 44 | 46 |
| Extruding Properties (Extruder Head 100° C., Cylinder 1/2 80/90° C., Screw (70° C., 60 rpm), rod die) | | | |
| Extrusion Length (m/min) | 24 | 25 | 25 |
| Extrusion Speed (g/min) | 845 | 857 | 860 |
| Die Expansion (%) | 49 | 46 | 46 |
| Surface (Good/Bad) | | | |
| Compression Set (160° C. × 40 min, vulcanizing press, 25% inclination) | | No Crack | No Crack |
| 100° C. × 72 hr (%) | 15 | 15 | 15 |
| 30° C. × 72 hr (%) | 22 | 22 | 21 |

Note:
LV/MV Insulating Composition: EPDM 100 phr, zinc oxide 5 phr, stearic acid 1 phr, HAF black 5 phr, paraffin oil 50 phr, mistron vapor 120 phr, coagent TAC 2 phr, DCP 40C 7 phr As shown in above Tables, the temperature of the supply stream composed of hexane, ethylene, propylene, and ENB to be loaded into the reactor is controlled, whereby the productivity of the polymer per unit time can be increased in the thermally stable temperature range of a conventional Ziegler Natta catalyst system using the same reactor. As in Example 3, the polymer solution can be effectively volatilized through direct drying.

As described above, the present invention provides methods of preparing an EP(D)M elastomer, of controlling the yield thereof, and of recovering the same. In the present invention, only the temperature of the reactive solvent is controlled while using the unchanged conventional EP(D)M preparation device, whereby the yield of EP(D)M can be remarkably increased. That is, even if the reactor and the catalyst system used to conventionally prepare the EP(D)M elastomer are used unchanged, the production of polymer per unit time in the thermally stable temperature range for the catalyst system can be increased.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of increasing yield of an EP(D)M elastomer, comprising:
   (1) pre-cooling a reactive solvent to a temperature ranging from −80 to −100° C.; and
   (2) polymerizing ethylene, at least one higher α-olefin having 3 to 18 carbons, and optionally, at least one conjugated or non-conjugated diene having 5 to 15 carbons in the presence of the reactive solvent to increase the yield of the EP(D)M elastomer.

2. The method as set forth in claim 1, wherein the polymerizing is performed in the presence of a catalyst containing a transition metal belonging to Groups IVb, Vb or VIb in the periodic table.

3. The method as set forth in claim 2, wherein the transition metal is vanadium or titanium.

4. The method as set forth in claim 1, wherein the reactive solvent is selected from the group consisting of aliphatic, alicyclic and aromatic hydrocarbons.

5. The method as set forth in claim 1, wherein the reactive solvent is selected from among straight linear or branched saturated hydrocarbons having 12 or less carbons, and alicyclic or aromatic saturated hydrocarbons having 5 to 9 carbons.

6. The method as set forth in claim 1, wherein the reactive solvent is hexane.

7. A method of recovering an EP(D)M elastomer, comprising:
   (1) pre-cooling a reactive solvent to a temperature ranging from −80 to −100° C.;
   (2) polymerizing ethylene, at least one higher α-olefin having 3 to 18 carbons, and optionally, at least one conjugated or non-conjugated diene having 5 to 15 carbons, in the presence of the reactive solvent, to prepare an EP(D)M elastomer;
   (3) mixing the EP(D)M elastomer with the reactive solvent to prepare a mixture, and pre-heating the mixture by heat exchange using steam immiscible with the mixture;
   (4) reducing a pressure of the mixture to primarily remove the solvent from the mixture; and
   (5) thermally drying the mixture obtained in (4), to secondarily remove residual solvent from the mixture.

8. The method of claim 1, wherein the elastomer is an EPDM elastomer, and the polymerizing step comprises polymerizing said conjugated or non-conjugated diene with the ethylene and the higher α-olefin.

9. The method of claim 1, wherein the elastomer is an EPM elastomer, and the polymerizing step comprises polymerizing the ethylene and the higher α-olefin.

10. The method of claim 7, wherein the elastomer is an EPDM elastomer, and the polymerizing step comprises polymerizing said conjugated or non-conjugated diene with the ethylene and the higher α-olefin.

11. The method of claim 7, wherein the elastomer is an EPM elastomer, and the polymerizing step comprises polymerizing the ethylene and the higher α-olefin.

* * * * *